United States Patent
Kodama et al.

(10) Patent No.: US 11,351,936 B2
(45) Date of Patent: Jun. 7, 2022

(54) SHIELDED WIRE HARNESS, SHIELDING MEMBER AND METHOD OF PRODUCING A SHIELDED WIRE HARNESS

(71) Applicant: Sumitomo Wiring Systems, Ltd., Mie (JP)

(72) Inventors: Hiroyuki Kodama, Mainz-Kastel (DE); Ventsislav Mironov, Mainz-Kastel (DE)

(73) Assignee: Sumitomo Wiring Systems, Ltd, Yokkaichi (JP)

( * ) Notice: Subject to any disclaimer, the term of this patent is extended or adjusted under 35 U.S.C. 154(b) by 1305 days.

(21) Appl. No.: 15/557,176

(22) PCT Filed: Mar. 4, 2016

(86) PCT No.: PCT/EP2016/000390
§ 371 (c)(1),
(2) Date: Sep. 11, 2017

(87) PCT Pub. No.: WO2016/142048
PCT Pub. Date: Sep. 15, 2016

(65) Prior Publication Data
US 2018/0037176 A1 Feb. 8, 2018

(30) Foreign Application Priority Data
Mar. 10, 2015 (DE) ...................... 10 2015 003 061.2

(51) Int. Cl.
*H01R 9/03* (2006.01)
*B60R 16/02* (2006.01)
(Continued)

(52) U.S. Cl.
CPC ....... *B60R 16/0215* (2013.01); *H01B 7/2825* (2013.01); *H01B 13/22* (2013.01);
(Continued)

(58) Field of Classification Search
CPC .. B60R 16/0215; H01B 7/2825; H01B 13/22; H01R 24/28; H01R 2103/00; H02G 3/0481
(Continued)

(56) References Cited

U.S. PATENT DOCUMENTS 5,571,992 A 11/1996 Maleski et al.
6,815,610 B2 * 11/2004 Kuboshima ........ H01R 13/5845
174/360
(Continued)

FOREIGN PATENT DOCUMENTS

DE 39 34 606 4/1991
DE 103 54 284 6/2004
(Continued)

OTHER PUBLICATIONS

International Search Report dated Jun. 24, 2016.
(Continued)

*Primary Examiner* — Abdullah A Riyami
*Assistant Examiner* — Vladimir Imas
(74) *Attorney, Agent, or Firm* — Gerald E. Hespos; Michael J. Porco; Matthew T. Hespos

(57) ABSTRACT

A shielded wire harness has one or more of wires (30); a shielded connector (58) with one or more terminals (40) connected respectively to the wires (30), and configured to be connected to a mating connector (12); and a substantially tubular shielding member (50) configured to collectively enclose the wires (30) and to be connected to the shielded connector (58). The shielding member (50) has a main shield portion (51) made of a conductive pipe (51), and a sub-shield portion (54) connected to the conductive pipe (51) and the shielded connector (58). The sub-shield portion (54) has a braided member (52) at least partly covered by a coating (53) that provides fluid-tightness when the sub-
(Continued)

shield portion (54) is connected to the conductive pipe (51) and the shielded connector (58). A corresponding shielding member and manufacturing method are provided.

11 Claims, 7 Drawing Sheets

(51) Int. Cl.
  *H01B 7/282* (2006.01)
  *H02G 3/04* (2006.01)
  *H01B 13/22* (2006.01)
  *H01R 24/28* (2011.01)
  *H01R 103/00* (2006.01)

(52) U.S. Cl.
  CPC .......... *H01R 24/28* (2013.01); *H02G 3/0481* (2013.01); *H01R 2103/00* (2013.01)

(58) Field of Classification Search
  USPC .................................................. 439/607.47
  See application file for complete search history.

(56) References Cited

U.S. PATENT DOCUMENTS

| | | | | |
|---|---|---|---|---|
| 7,094,970 | B2* | 8/2006 | Kihira | B60L 50/51 174/74 R |
| 7,135,790 | B2* | 11/2006 | Fondriest | B64C 25/36 307/147 |
| 7,497,284 | B2* | 3/2009 | Yamaguchi | B60R 16/0215 174/135 |
| 7,563,981 | B2* | 7/2009 | Ichikawa | B60R 16/0215 174/102 R |
| 7,700,879 | B2* | 4/2010 | Watanabe | H01B 7/16 174/102 R |
| 7,811,132 | B2* | 10/2010 | Carpenter | H01R 13/512 439/607.41 |
| 8,460,015 | B2* | 6/2013 | Deno | H01R 13/6593 439/98 |
| 8,525,029 | B2* | 9/2013 | Kato | C07C 227/04 174/113 R |
| 8,637,770 | B2* | 1/2014 | Adachi | B60R 16/0222 174/74 R |
| 9,017,110 | B2* | 4/2015 | Guillanton | H02G 3/0462 439/730 |
| 9,263,865 | B2* | 2/2016 | Adachi | H02G 3/0406 |
| 9,270,060 | B2* | 2/2016 | Adachi | H01R 13/6596 |
| 9,318,849 | B2* | 4/2016 | Kobayashi | H01R 13/5216 |
| 9,325,120 | B2* | 4/2016 | Imahori | H01R 13/6592 |
| 9,343,821 | B2* | 5/2016 | Fuzioka | H01B 7/2825 |
| 9,490,051 | B2* | 11/2016 | Inao | H02G 3/0481 |
| 9,502,153 | B2* | 11/2016 | Adachi | H01B 7/0045 |
| 9,520,214 | B2* | 12/2016 | Nakai | H02G 3/0481 |
| 9,558,866 | B2* | 1/2017 | Shiga | H02G 3/06 |
| 9,623,815 | B2* | 4/2017 | Adachi | B29C 63/42 |
| 2004/0099427 | A1 | 5/2004 | Kihira | |
| 2004/0144557 | A1* | 7/2004 | Miyazaki | H01R 13/6592 174/72 A |
| 2005/0162015 | A1 | 7/2005 | Yamaguchi et al. | |
| 2006/0254798 | A1* | 11/2006 | Reed | H02G 3/0481 174/72 A |
| 2014/0102753 | A1 | 4/2014 | Wild et al. | |
| 2014/0251681 | A1* | 9/2014 | Adachi | H02G 3/0481 174/72 A |
| 2014/0326479 | A1 | 11/2014 | Itani et al. | |
| 2015/0000974 | A1* | 1/2015 | Shiga | H02G 3/0481 174/72 A |
| 2015/0136482 | A1* | 5/2015 | Adachi | H02G 3/0468 174/72 A |

FOREIGN PATENT DOCUMENTS

| | | |
|---|---|---|
| EP | 1 744 409 | 1/2007 |
| EP | 2 802 048 | 11/2014 |
| JP | 2010-40396 | 2/2010 |

OTHER PUBLICATIONS

German Office Action dated Jan. 22, 2016.
International Preliminary Report on Patentability dated Jan. 30, 2017.

* cited by examiner

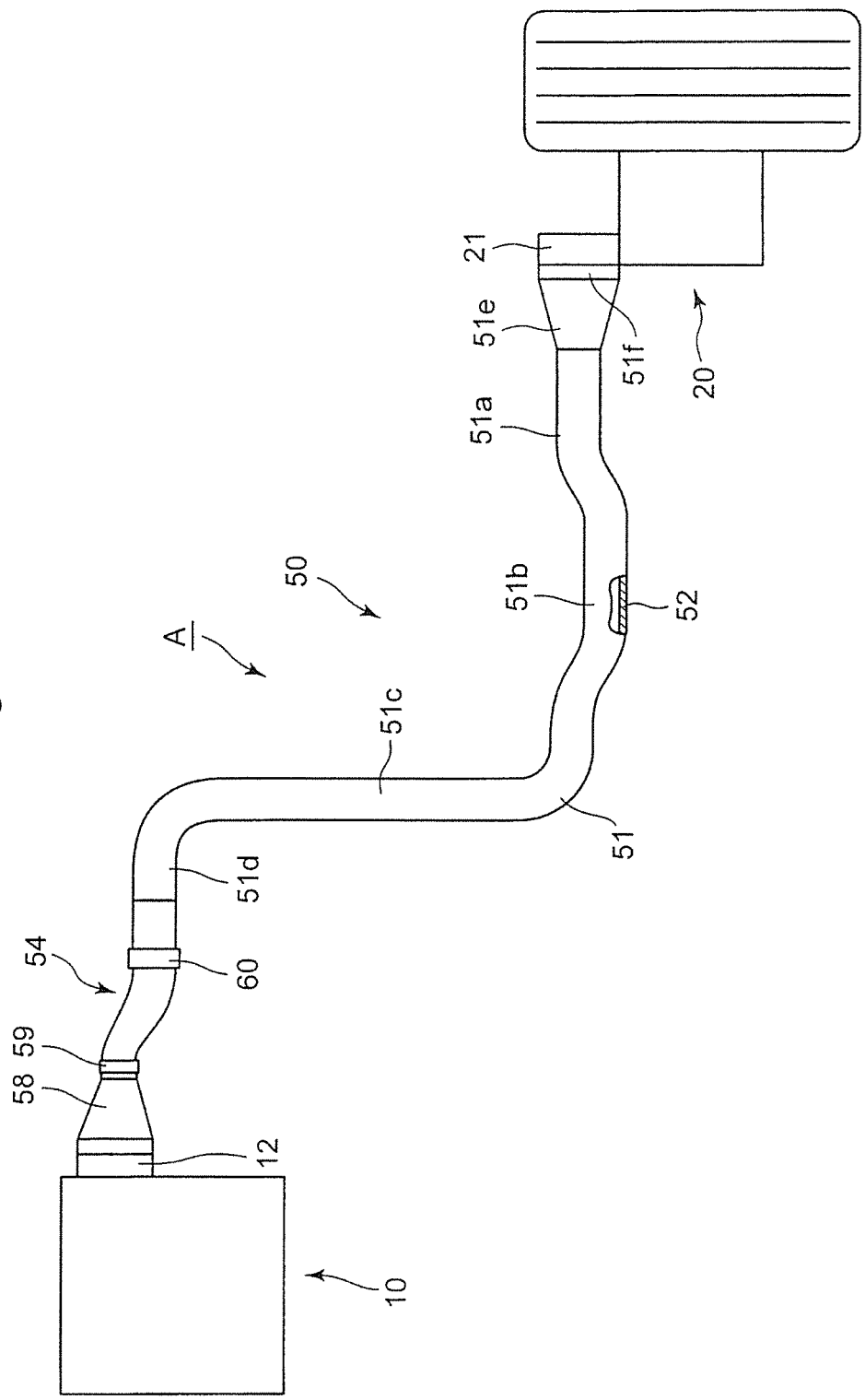

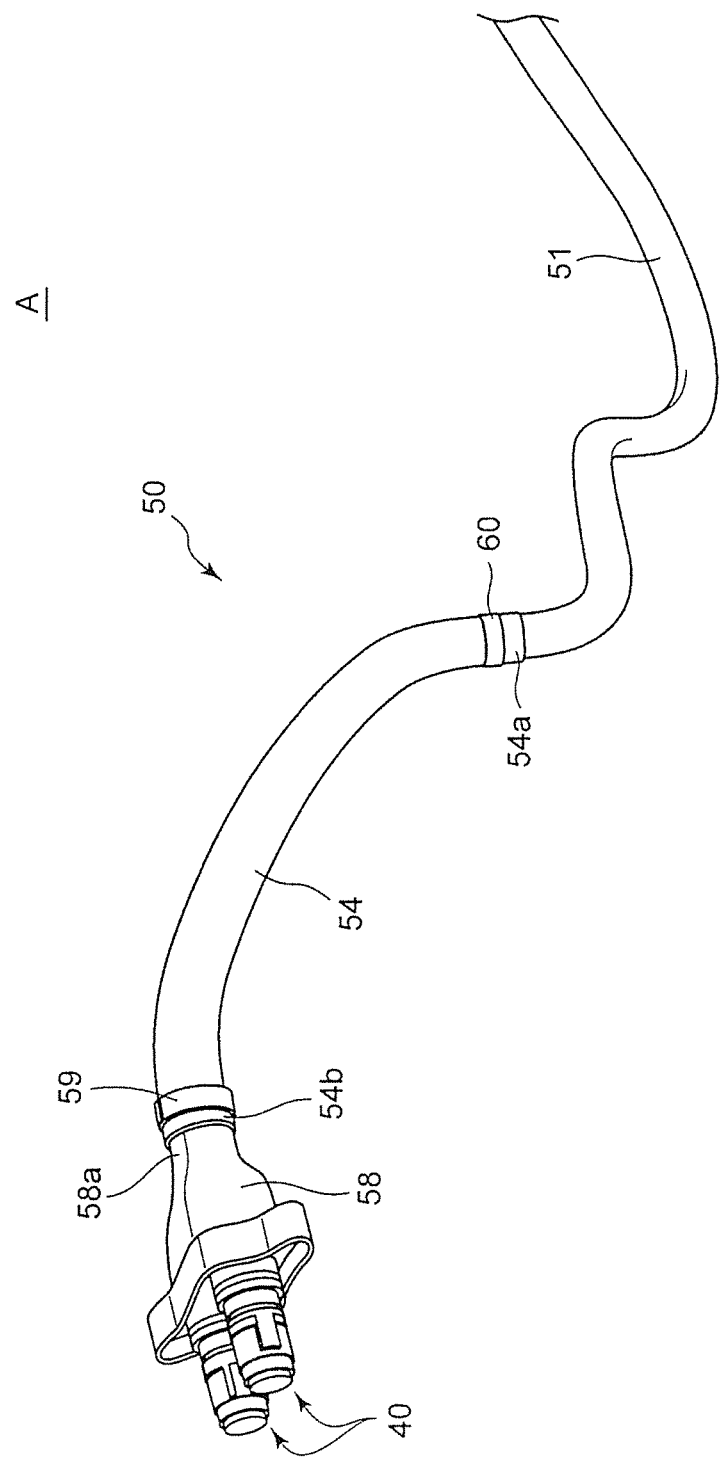

SHIELDED WIRE HARNESS, SHIELDING MEMBER AND METHOD OF PRODUCING A SHIELDED WIRE HARNESS

BACKGROUND

Field of the Invention

The present invention relates to a shielded wire harness, to a shielding member and to a method of producing a shielded wire harness.

Description of the Related Art

It is known in the art to shield wire harnesses used in vehicles, particularly used in electric vehicles (EV), in order to avoid unwanted influences in the electric system thereof. Such shielding can be achieved by individually shielding each wire or cable or by collectively shielding plural wires or cables by a shield layer such as by a braided shielding. Furthermore, it has been known e.g. from US 2014/0326479 A1 to use an electric-wire protection pipe which is a metal pipe that surrounds plural electric wires.

According to the present invention it is an object to improve shielding properties and sealability for a wire harness for a vehicle.

This object is solved according to the invention by the features of the independent claims, Particular embodiments of the invention are subject of the dependent claims.

SUMMARY

According to one aspect of the invention, there is provided a shielded wire harness comprising: one or more of wires; a shielded connector comprising one or more terminals respectively connected to the wire(s), and configured to be connected to a mating connector; and a shielding member substantially formed in a tube shape and configured to collectively enclose the wire(s) and to be connected to the shielded connector, wherein the shielding member comprises a main shield portion made of a conductive pipe, and a sub-shield portion connected to the conductive pipe and the shielded connector, and wherein the sub-shield portion comprises a braided member being at least partly covered by or formed with a coating which provides fluid-tightness or sealability when the sub-shield portion is connected to the conductive pipe and the shielded connector.

Accordingly, by providing the shielding member comprising a main shield portion made of a conductive pipe and a sub-shield including a braided member being at least partly covered by a coating high electromagnetic shielding properties and providing a high sealability (particularly fluid- or water-tightness) for the wire(s) arranged in the main shield portion. Moreover, the main shield portion made of the conductive pipe particularly allows for easily arranging the wire harness in a vehicle particularly taking into account its chassis design by bending the conductive pipe accordingly. Furthermore, particularly due to a stiffness of the conductive pipe, it can be easily fixed to the vehicle at a reduced number of fixing points and/or it can efficiently protect the wire(s) against outside interactions (such as hitting of exterior objects e.g. stones). Accordingly, the shielded wire harness can be advantageously arranged in an underfloor layout of the vehicle. Moreover, the pipe-shape main shield portion allows to protect the wire(s) from heat so that routing of the wire harness in the vehicle is facilitated, since the shielded wire harness may also be arranged close to the exhaust system, the engine or any other vehicle part which in operation may be strongly heated. Moreover, the shielded wire harness collectively enclosing plural wires has a lower overall weight as compared to a bundle of individually shielded cables.

According to a particular embodiment, the braided member at least partly is embedded in the coating.

According to a further particular embodiment, the conductive pipe is a metal pipe, preferably made of a metal selected from iron, aluminum, copper and stainless steel.

According to such a configuration, the conductive pipe can be easily manufactured and brought into the shape necessary for mounting it to the vehicle.

Particularly, the sub-shield portion is configured to be deformable.

According to such a configuration, the shielded wire harness can be more easily mounted to the vehicle, as the sub-shield portion can accommodate for size tolerances. Furthermore, the deformable sub-shield portion can adsorb vibrations and thus suppress vibration propagation between components of the vehicle.

Further particularly, the braided member is substantially formed in a tube shape by braided metal wires.

According to such a configuration, the braided member provides excellent electromagnetic shielding properties while allowing a sufficient flexibility or deformability of the sub-shield portion.

Further particularly, the coating is made of an elastomer, wherein the elastomer preferably is chosen from the group of a silicone elastomer, a polyamide elastomer and a polyolefin elastomer, wherein the polyolefin elastomer more preferably is chosen from the group of polyethylene (PE) and polyethylene vinyl chloride (PEVC).

According to such a configuration, the sub-shield portion can be easily manufactured, have good isolation properties and/or have a good flexibility.

Further particularly, the sub-shield portion is connected to the conductive pipe and/or the shielded connector by means of at least one fixing member.

According to such a configuration, the shielding member can be easily assembled.

Further preferably, a connection area of the sub-shield portion to the conductive pipe and/or the shielded connector is covered by at least one sealing member.

According to such a configuration, it is possible to ensure sealability (particularly water-tightness) of the shielding member, as not only the sub-shield portion (by means of its coating) and the conductive pipe are properly sealed, but also their connection area is properly sealed by the sealing member.

According to a further aspect of the invention, there is provided a shielding member for a shielded wire harness comprising one or more of wires and a shielded connector, wherein: the shielding member is formed in a tube shape and configured to enclose the wire(s) collectively and to be connected to the shielded connector, the shielding member comprises a main shield portion made of a conductive pipe, and a sub-shield portion connected to the conductive pipe and the shielded connector, and the sub-shield portion comprises a braided member being at least partly covered by or formed with a coating.

Accordingly, by providing the shielding member comprising a main shield portion made of a conductive pipe and a sub-shield including a braided member being at least partly covered by or formed with a coating high electromagnetic shielding properties and providing a high sealability (particularly water-tightness) for the wire(s) arranged in the main shield portion. Moreover, the above mentioned advantages can be further achieved.

According to a particular embodiment, the braided member is substantially formed in a tube shape by braided metal wires, and/or the coating is made of an elastomer, wherein the elastomer preferably is chosen from the group of a silicone elastomer, a polyamide elastomer and a polyolefin elastomer, wherein the polyolefin elastomer more preferably is chosen from the group of polyethylene (PE) and polyethylene vinyl chloride (PEVC).

According to such a configuration, the sub-shield portion can be easily manufactured, have good isolation properties and/or have a good flexibility.

According to a further aspect of the invention, there is provided a method of producing a shielded wire harness, in particular according to the above aspect of the invention or a particular embodiment thereof, comprising the following steps: providing one or more of wires; collectively enclosing the wire(s) by means of a shielding member formed in a tube shape; respectively connecting one or more terminals of a shielded connector to the wire(s); and connecting the shielding member to the shielded connector; wherein the shielding member comprises a main shield portion made of a conductive pipe, and a sub-shield portion connected to the conductive pipe and the shielded connector, and wherein the sub-shield portion comprises a braided member being at least partly covered by or formed with a coating which provides fluid-tightness or sealability when the sub-shield portion is connected to the conductive pipe and the shielded connector.

Accordingly, it is possible to produce a shielded wire harness having good sealability (particularly water-tightness) of the shielding member.

According to a particular embodiment, the coating is made of an elastomer, wherein the elastomer preferably is chosen from the group of a silicone elastomer, a polyamide elastomer and a polyolefin elastomer, wherein the polyolefin elastomer more preferably is chosen from the group of polyethylene (PE) and polyethylene vinyl chloride (PEVC).

Particularly, the braided member at least partly is embedded in the coating.

Further particularly, the sub-shield portion is connected to the conductive pipe and/or the shielded connector by means of at least one fixing member.

Further particularly, the method further comprises covering at least one of a connection area of the sub-shield portion to the conductive pipe and the shielded connector (58) by at least one sealing member.

These and other objects, features and advantages of the present invention will become more apparent upon reading of the following detailed description of preferred embodiments and accompanying drawings. It should be understood that even though embodiments are separately described, single features thereof may be combined to additional embodiments.

BRIEF DESCRIPTION OF THE DRAWINGS

FIG. 1a is a schematic side view, showing a state in which a shielded wire harness according to an embodiment of the invention is interposed between two pieces of equipment.

FIG. 2 is a perspective view of a part of a shielded wire harness according to an embodiment of the invention.

DETAILED DESCRIPTION

Figure 1B:
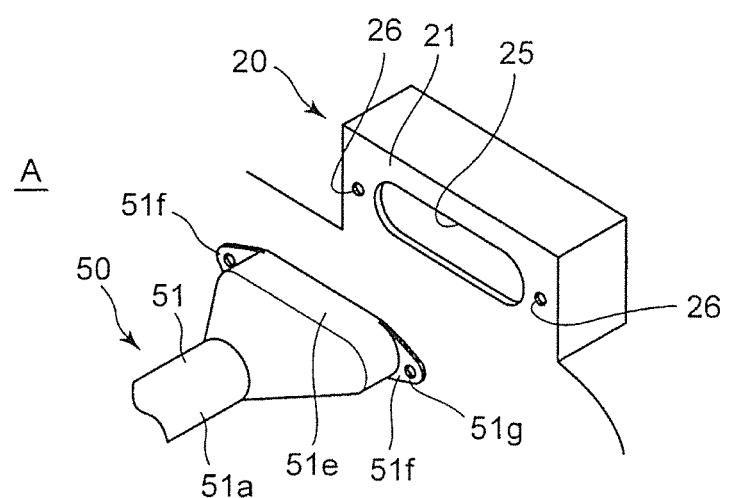
FIG. 1b is a perspective view of the motor-side end portion of the shielded wire harness.
Figure 3:
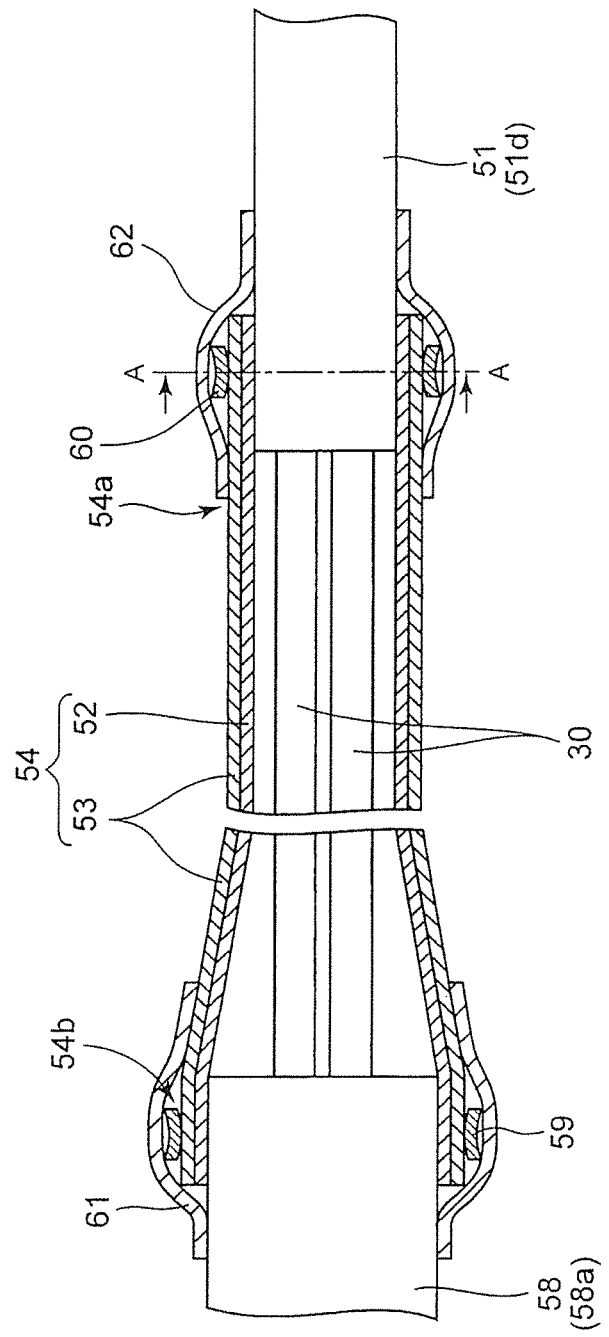
FIG. 3 is a longitudinal sectional view of a part of the shielded wire harness.
Figure 4:
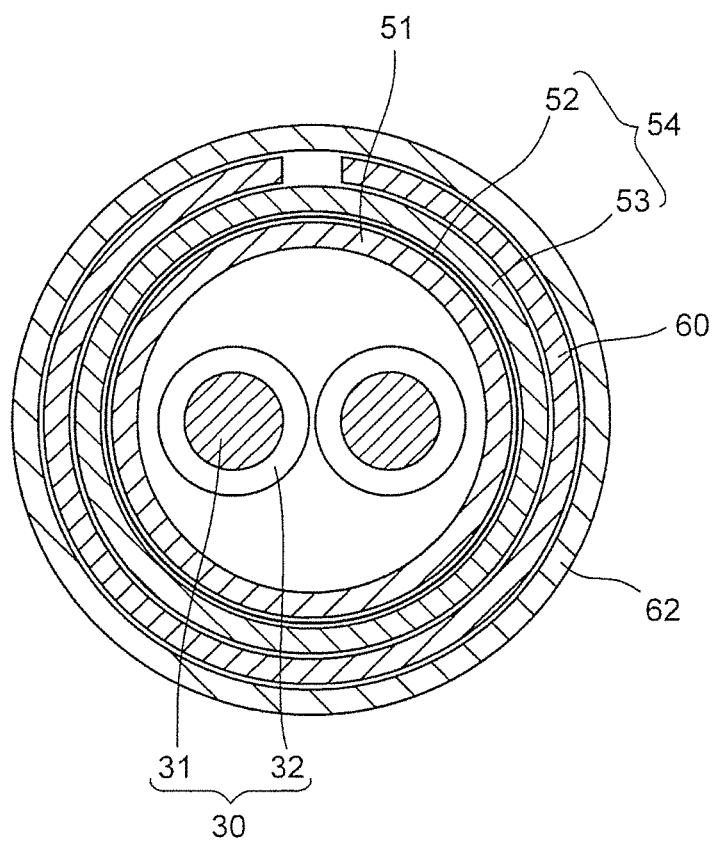
FIG. 4 is a sectional view of along A-A of FIG. 3.

Referring now to the accompanying drawings, a description will be given in detail of preferred embodiments of the invention.

A shielded wire harness A according to a first particular embodiment of the present invention, described with reference to FIGS. 1 through 4, is used for connecting a first equipment 10 (such as an inverter unit) of a vehicle (particularly an electric vehicle (EV), a hybrid electric vehicle (EHV), plug-in hybrid electric vehicle (PEHV), range extended electric vehicle (REEV) and the like) to a second equipment 20 (such as a motor) respectively disposed in the vehicle.

The first equipment 10 is e.g. disposed in an engine room and is structured such that an equipment connector 12 (as a particular mating connector) having one or more equipment-side terminals extended from the first equipment 10 are at least partly accommodated in a connector housing having shielding properties.

The motor 20 particularly is disposed on a wheel of the electric vehicle and is structured such that a coil (not shown) and equipment-side terminals (not shown) connected to the coil are stored in a conductive shield case 21. Each of the equipment-side terminals may particularly be formed as a thick plate shape referred to as a bus bar and includes a bolt hole which penetrates through the terminal in the thickness direction thereof. In the side wall of the shield case 21, there are formed one or more mounting holes shaped in oblong so as to correspond to the three equipment-side terminals, and also there are formed a pair of female screw holes 26 which are situated on the two right and left sides of the mounting holes 25.

Next, description will be given below of the shielded wire harness A according to the first embodiment.

The wire harness A includes one or more wires 30, at least one shielded connector 58 provided on at least one side of the wire(s) 30 and comprising a shielded housing at least partly accommodating one or more terminals 40, which are to be electrically connected to the wire(s) 30 and a tube-shaped shielding member 50 (bracket shield) collectively enclosing the one or more wires 30. In other words, the wire(s) 30 are arranged inside the conductive tube-shaped shielding member 50 thus shielding the wire(s) 30 from electromagnetic radiation and/or protecting them from outside interactions (water, hitting objects, etc.). It should be understood that a second shielded connector may be provided also at the second end of the wire(s) 30. Alternatively or additionally, wire-side terminals may be fixedly secured to the other end portion of each of the one or more wires 30 to be directly connected to an equipment e.g. by bolting, i.e. without interposition of a connector and mating connector. In such case, each of the wire-side terminals may be made of a thick metal plane member; and, a front portion (particularly a substantially front-half section) of each of the wire-side terminals provides an equipment connecting portion which is formed in a substantially-flat-plate shape and includes a bolt hole penetrating in a thickness direction of the wire-side terminal through the equipment connecting portion, while a rear portion (particularly a substantially-rear-half section) provides an open-barrel-shaped wire pressure connect portion. Specifically, a conductor 31 of the wire 30 may be crimped or pressure connected to the wire pressure connect portion 43 in a conductible manner.

The one or more (e.g. two) wires 30 each include a conductor 31 and an insulation sheath 32 enclosing the outer periphery of the conductor 31 and, differently from a shielded wire, no shield layer is arranged in or on the wire 30.

The shielding member 50 includes: a main shield portion 51 which is long in dimension, conductive, and particularly extends for more than about two thirds (particularly almost the entire length) of the shielding member 50; and a sub-shield portion 54 as a particular connector end portion of the shielding member 50, and is shorter than the main shield portion 51.

The main shield portion 51 includes a (particularly substantially cylindrical or elliptical shaped) pipe or tubular member made of conductive material such as metal (e.g. iron, aluminum, copper, or stainless steel), and has an inside diameter that allows the one or more (e.g. two) wires 30 to be inserted through the main shield portion 51. The main shield portion 51 substantially is bent along the wiring route of the wire harness A. That is, the portion of the main shield portion 51 situated adjacent to the motor 20 provides a long horizontal portion 51a e.g. extending substantially in the horizontal direction, while part of the long horizontal portion 51a is formed low in position. The low portion is a lowest portion 51b that is lowest in the wiring route of the wire harness A and, in the lowest portion 51b, there particularly may be formed at least one drain hole 52' which is open on the lower surface side thereof. A rising portion 51c is formed so as to substantially extend upwardly from the end portion of the long horizontal portion 51a of the main shield portion 51 on the opposite side to the motor 20 and, from the upper or distal end portion of the rising portion 51c, there is formed a short horizontal portion 51d in such a manner that it extends substantially horizontally toward the first equipment 10. Also, a motor-side end portion of the long horizontal portion 51a provides a substantially elliptic portion 51e which substantially spreads in a tapered shape in the lateral direction. In or at the open edge portion of the substantially elliptic portion 51e, there are formed one or more, particularly a pair of mounting portions 51f which project in the lateral directions and, in (particularly each of) the mounting portion(s) 51f, there is formed a bolt hole 51g. On the other hand, the connector end portion of the short horizontal portion 51d particularly may be formed in a substantially circular shape.

The sub-shield portion 54 includes a (particularly substantially tube-shaped) braided member 52 which is at least partly covered by or formed with or embedded in a coating 53.

The (tube-shaped) braided member 52 particularly is formed by braiding together conductive thin lines particularly made of metal (e.g. copper or aluminum) in a mesh-like manner. Particularly, the braided member 52 at least partly is embedded in the coating 53 so that the thin lines at least partly are surrounded by the (particularly elastomeric) material of the coating 53. Thus, an increased sealability or fluid-tightness is achieved. In view of allowing a simple electric connection to the main shield portion 51 and/or the shielded connector 58, the braided member 52 is not completely embedded in the coating 53, but one or more portions thereof are left not embedded or non-coated so that at least part of the thin lines can be electrically connected to the main shield portion 51 and/or the shielded connector 58, respectively. In specific applications, additional plastic wires or yarn may be meshed into the braided member 52 to improve the mechanical properties of the sub-shield portion 54. One end portion (main-shield-portion-side) of the tube-shaped braided member 54 is formed as a pipe-side portion 54a having a diameter dimension necessary for insertion of the one or more wires 30 and to be connectable to the respective part of the conductive pipe 51, while the other (connector-side) end portion thereof is formed as a connector-side portion 54b which is able to store the one or more wires 30 (and potentially also the one or more wire-side terminals in such a manner that they are arranged spaced apart from each other in the lateral direction thereof). Moreover, in case the braided member 52 is connected to the shielded connector 58, the connector-side portion 54b is dimensioned such that it can be connected to a braided-member side connector portion 58a.

The braided member 52 is at least partly covered by or formed with or embedded in a flexible coating 53, so that the sub-shield portion 54 is overall configured to be deformable. The coating 53 particularly is made of an elastomer, particularly chosen from the group of a silicone elastomer, a polyamide elastomer and a polyolefin elastomer, such as polyethylene (PE) or polyethylene vinyl chloride (PEVC). The sub-shield portion 54 particularly is configured such that the coating 53 is substantially provided only on the outside surface of the braided member 52. Accordingly, the braided member 52 is at least partly exposed to the inner side of the substantially tubular sub-shield portion 54. In some instances, the braided member 52 may be (particularly slightly) immersed or embedded in the coating 53, but inner parts of the braided member 52 may still be exposed in order to contact the main shield portion 51 (as described hereinafter). By providing the coating 53, fluid-tightness (particularly water-tightness) is achieved for the sub-shield portion 54.

The connector portion 58a of the connector particularly may be made of metal (e.g. iron, aluminum, copper or stainless steel) and/or particularly may be formed in a cylindrical shape having a dimension substantially equal to the short horizontal portion 51d of the main shield portion 51. The connector portion 58a particularly has a length necessary and sufficient to connect together the tube-shaped braided member 54 and the main shield portion 51, while the length dimension thereof is much shorter than that of the main shield portion 51.

The pipe-side portion 54a of the tube-shaped braided member 54 is fitted with the outer surface of the first equipment-side end portion of the main shield portion 51 (particularly on the short horizontal portion 51d), at least one caulking ring or clamp 60 is fitted with the outer surface of the pipe-side portion 54a from outside, and, by caulking or deforming the caulking ring 60, the pipe-side portion 54a of the tube-shaped braided member 54 is conductively fixed to the distal end portion (particularly on the short horizontal portion 51d) of the main shield portion 51. N this respect it is noted that the braided member 54 is at least partly exposed to the inner side of the sub-shield portion 54 so that it can be easily electrically connected to the main shield portion 51. Accordingly, the electromagnetic shielding properties are improved. Also, a tin plating treatment (not shown) particularly is enforced or may be provided on the outer peripheral surface of the main shield portion 51, that is, particularly on the surface thereof to be contacted with the tube-shaped braided member 54. Specifically, the tin plating treatment can reduce the contact resistance between the main shield portion 51 and (particularly tube-shaped) braided member 54. Incidentally, in the embodiment, on the surface of the main shield portion 51 with which the tube-shaped braided member 54 is not directly contacted, particularly there is not enforced or provided a plating treatment for reduction of the contact resistance between them. However, an anti-corrosion plate may be enforced or provided (for example, in case where the main shield portion 51 is made of iron, a zinc plating treatment may be enforced on the surface thereof).

Furthermore, a sealing member 62 may be provided in correspondence of the connecting area of the braided member 54 and the main shield portion 51. The sealing member 62 may be provided by arranging a heat-shrinkable tube over the connecting area and subsequently shrinking it to seal the connection of the braided member 54 and the main shield portion 51. Alternatively or additionally, the sealing member 62 may comprise taping wound over the connecting area.

The connector-side portion 54b of the tube-shaped braided member 54 is placed on the braided-member side connector portion 58a of the shielded connector 58, a caulking ring 59 is fitted with the connector-side portion 54b from the outside thereof and, by caulking or deforming the caulking ring 59, the connector-side portion 54b of the tube-shaped braided member 54 is conductively fixed to the connector portion 58a of the shielded connector 58.

To connect the wire harness A above configured to the first equipment 10, firstly, the shielded connector 58 housing the one or more terminals 40 electrically connected to the wire(s) 30 and electrically connected to the shielding member 50 is connected to a mating connector 12 provided at the first equipment 10 such as an electric device (particularly an inverter).

Although not shown, the connection of the wire harness A and the second equipment (e.g. the motor) 20 is also executed similarly to the connection of the wire harness A and first equipment (e.g. the inverter unit) 10. Alternatively, one or more wire-side terminals (not shown) projected from the substantially-elliptic-shaped portion 51e forming the end portion of the long horizontal portion 51a are inserted into their associated mounting holes 25 of the shield case 21 to thereby place the equipment-side connecting portion onto equipment-side terminals (not shown), and the (particularly two kinds of) terminals are then conductively connected to each other using bolts and nuts. Incidentally, the main shield portion 51 is fixed to a vehicle body (not shown) at one or more positions in the intermediate portion of the wiring route of the wire harness A.

As described above, the wire harness A according to the embodiment is structured such that the shielding member 50 enclosing the one or more wires 30 collectively comprises the main shield portion 51 composed of a metal-made pipe and the sub-shield portion 54 formed to be deformable particularly because it is shorter than the main shield portion 51 and/or it uses the tube-shaped braided member 52 (at least partly) covered by or formed with or embedded in a flexible coating 53. As a result, the wire harness A can provide the following advantages.

Since the main shield portion 51 particularly is made of a metal-made pipe, it not only can fulfill a shield function but also can positively protect the one or more wires 30 from objects such as bouncing stones. In this manner, because the main shield portion 51 (particularly constituting or forming a major part of the shielding member 50) serves also as means for protecting the wire(s) 30, the number of parts can be reduced when compared with a structure in which protect means is disposed separately from the shielding member 50.

Since the main shield portion 51 particularly is made of a metal pipe, if the two ends of the main shield portion 51 are fixed generated stresses in the fixed portions due to the vibrations thereof. However, in the embodiment, because the sub-shield portion 54 particularly is formed flexible, it can absorb the vibrations, thereby being able to avoid the generation of the stresses in the fixed portion thereof to the first equipment.

Also, the sub-shield portion 54 includes the substantially tube-shaped braided member 52 and, because the tube-shaped braided member 52 is composed of or comprises metal thin lines braided together, it can be deformed flexibly. Therefore, the sub-shield portion 54 is able to cope with even a case in which the one or more wires 30 are bent and/or wired with large curvature in the neighbouring portion of the equipment.

Since the (tube-shaped) braided member 52 is made of metal thin lines, the contact area thereof with the main shield portion 51 (particularly with the short horizontal portion 51d thereof) is small and thus the two parts 52 and 51 can be lowered in reliability. However, according to the embodiment, because a plating treatment for reducing the contact resistance of the main shield portion 51 with respect to the (tube-shaped) braided member 52 particularly is enforced e.g. in correspondence of the short horizontal portion 51d, the contact reliability of the two parts 52 and 51 is high.

Moreover, the plate treatment may be enforced substantially only on the part of the main shield portion 51 which is to be contacted with the tube-shaped braided member 52, and no plating is necessary on the long main shield portion 51. Therefore, it is possible to reduce the cost of the wire harness A down to a low level.

In addition, in the main shield portion 51 of the shielding member 50, specifically, in the lowest portion of the wiring route of the wire harness, there particularly is formed the drain hole 52' which is open in the substantially downward direction, thereby being able to discharge the water that collects in the interior of the shielding member 50. Due to the above configuration, it can positively prevent occurrence of an unfavourable phenomenon such as corrosion due to the existence of the water.

A shielded wire harness according to a further particular embodiment of the invention is described with reference to FIGS. 5 and 6. It should be understood that elements of the further embodiment similar to or substantially same as the first embodiment are denoted by the same reference numerals and a description is omitted herein.

Figure 5:
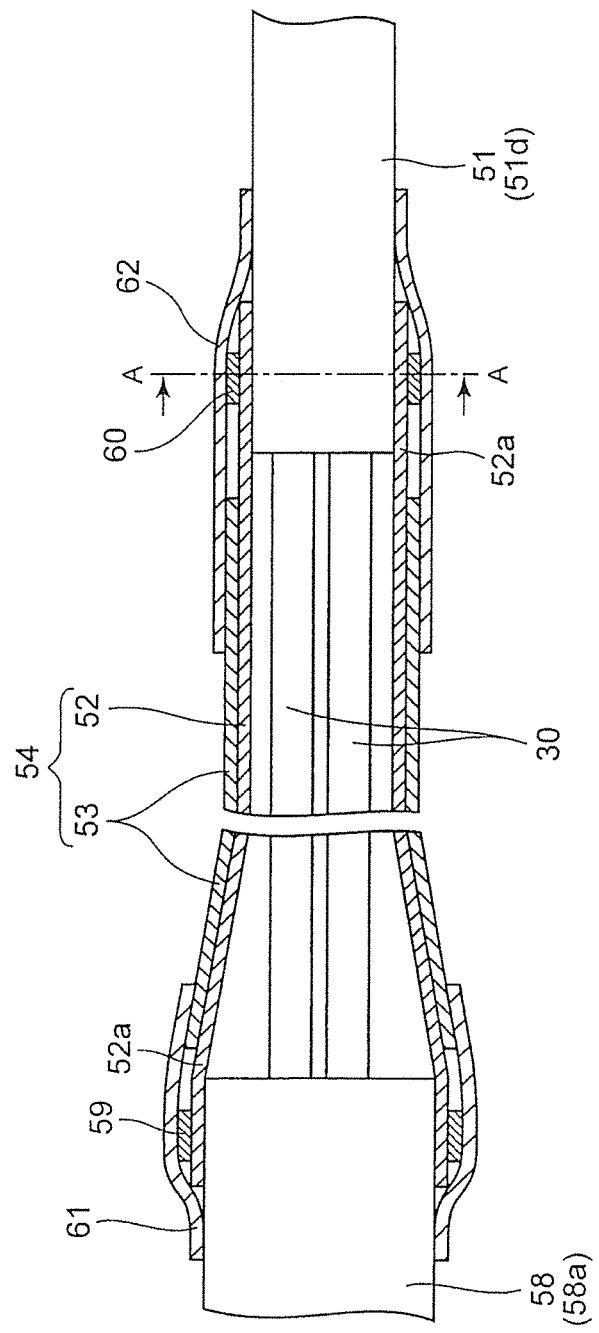
FIG. 5 is a longitudinal sectional view of a part of a shielded wire harness according to a further embodiment of the invention.
Figure 6:
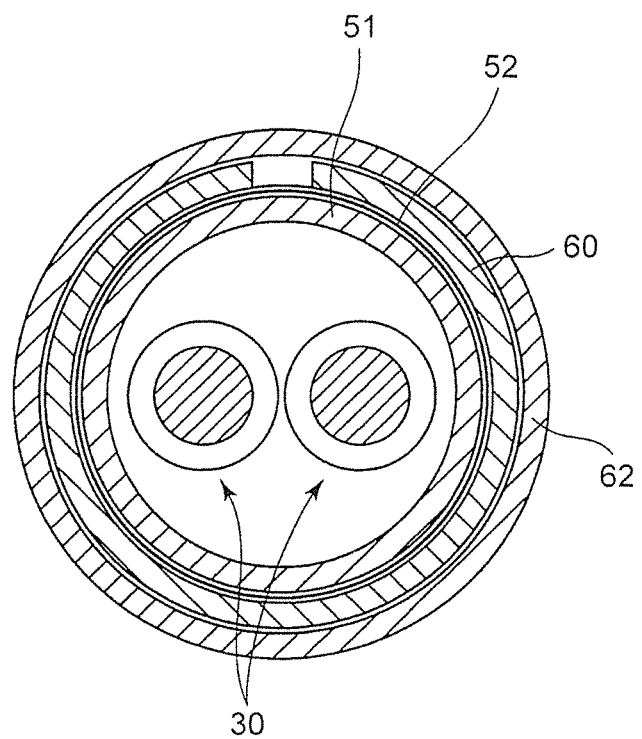
FIG. 6 is a sectional view of along A-A of FIG. 5.

Unlike the first embodiment, in this embodiment the sub-shield portion 54 is such that the coating 53 is provided along the longitudinal extension of the (particularly tube-shaped) braided member 52 except on one or more distal ends of the sub-shield portion 54 so as to create one or more exposed portions 52a of the (particularly tube-shaped) braided member 52 (see FIG. 5). The exposed end portions 52a may be created by stripping-off a respective part of the coating 53 or by not providing the coating 53 on these portions 52a from the outset. The exposed end portion(s) 52a may then be fixed to and electrically connected with the main shield portion 51 (particularly to/with the short horizontal portion 51d thereof) and/or the shielded connector 58 (particularly with/to the braided-member side connector portion 58a thereof) by means of at least one caulking ring or clamp 60/59.

Accordingly, since the main shield portion particularly is composed of a metal-made pipe, it not only can fulfill a shielding function but also can positively protect the wires from object such as bounced stones. Further, because the main shield portion, which constitutes a major part of the shielding member, serves also as member to protect the wires, the number of parts can be reduced when compared with a wire harness which uses protecting members in addition to the shielding member. Since the main shield portion is made of a metal pipe, if the two ends of the main shield portion are fixed directly to the shield case, there can be generated stresses in the fixed portions due to vibrations or the like. However, because the sub-shield portion is deformable and thus can absorb the vibrations, actually, there can be prevented occurrence of the stresses in the fixed portions of the main shield portion to the shield case.

The present invention is not limited to the embodiments respectively discussed through the foregoing description and drawings but, for example, the following embodiments also fall within the technical scope of the invention. Also, other various changes and modifications than the following embodiments are also possible without departing from the scope of the claims.

(1) It should be understood that the braided member 52, particularly its exposed end portion(s) 52a may be connected to the main shield portion 51 and/or the shielded connector 58 by means other than a caulk ring 60/59 such as by welding or soldering or mechanical crimping, a hose clamp or the like.

(2) In the embodiments described above, the sub-shield portion is connected to the first equipment such as inverter unit. However, according to the invention, the sub-shield portion can also be alternatively or additionally connected to the motor.

(3) In the embodiments described above, the major area of the main shield portion is formed so as to have a substantially circular section except for the end portion thereof. However, according to the invention, the major area of the main shield portion may also be formed so as to have another section shape such as an elliptic section or a square shape.

(4) In the embodiments described above, the connecting pipe is formed so as to have a circular section. However, according to the invention, the connecting pipe may also be formed so as to have another section shape such as an elliptic section shape or a square section shape.

(5) In the embodiments described above, the tube-shaped braided member is directly connected to the main shield portion. However, according to the invention, tube-shaped braided member may be connected to the main shield portion through a connecting pipe fixedly connected to the main shield portion.

(6) In the embodiments described above, description has been given of a case in which the wire harness is used for connecting together the inverter unit and motor of an electric vehicle. However, the invention can also be applied to a wire harness which is arranged between other pieces of equipment.

Although the present invention has been shown and described with reference to a specific embodiment, various changes and modifications will be apparent to those skilled in the art from the teachings herein. Such changes and modifications as are obvious are deemed to come within the spirit, scope and contemplation of the invention as defined in the appended claims.

REFERENCE LIST

A . . . shielded wire harness
10 . . . first equipment (e.g. inverter)
12 . . . equipment connector (mating connector)
20 . . . second equipment (e.g. motor)
21 . . . conductive shield case
25 . . . mounting hole
26 . . . hole
30 . . . wires
31 . . . conductor
32 . . . insulation sheath
40 . . . terminal
50 . . . shielding member
51 . . . conductive pipe (main shield portion)
51a . . . horizontal portion
51b . . . lowest portion
51c . . . rising portion
51d . . . short horizontal portion
51e . . . substantially elliptic portion
51f . . . mounting portion
51g . . . bolt hole
52' . . . drain hole
52 . . . braided member
52a . . . exposed end portion
53 . . . coating
54 . . . sub-shield portion
54a . . . pipe-side portion
54b . . . connector-side portion
58 . . . shielded connector
58a . . . braided-member side connector portion
59, 60 . . . caulk ring (fixing member)
61, 62 . . . heat-shrinkable tube (sealing member)

The invention claimed is:

1. A shielded wire harness comprising: one or more wires;
a shielded connector comprising one or more terminals respectively connected to the wire(s), and configured to be connected to a mating connector; and
a substantially tubular shielding member configured to collectively enclose the wire(s) and to be connected to the shielded connector, wherein:
the shielding member comprises a main shield portion made of a conductive pipe, and a sub-shield portion connected to the conductive pipe and the shielded connector,
the sub-shield portion comprises a braided member being at least partly covered by a coating that provides fluid-tightness when the sub-shield portion is connected to the conductive pipe and the shielded connector,
the braided member at least partly is embedded in the coating,
at least one caulking ring is fitted to an outer surface of an end of the sub-shield portion to fix the sub-shield portion to at least one of the conductive pipe and the shielded connector, and
at least one sealing member is fitted to the outer surface of the end of the sub-shield portion and an outer surface of the caulking ring to seal a connection between the sub shield-portion and at least one of the conductive pipe and the shielded connector.

2. The shielded wire harness of claim 1, wherein the conductive pipe is a metal pipe.

3. The shielded wire harness of claim 1, wherein the sub-shield portion is deformable.

4. The shielded wire harness of claim 1, wherein the braided member is formed in a substantially tube shape by braided metal wires.

5. The shielded wire harness of claim 1, wherein the coating is made of an elastomer chosen from the group consisting of a silicone elastomer, a polyamide elastomer and a polyolefin elastomer.

6. The shielded wire harness of claim 1, wherein the sub-shield portion is connected to the conductive pipe and/or the shielded connector by at least one fixing member.

7. A shielding member for a shielded wire harness comprising one or more of wires and a shielded connector, wherein:
the shielding member is formed in a tube shape and configured to enclose the
one or more wires collectively and to be connected to the shielded connector,
the shielding member comprises a main shield portion made of a conductive pipe, and a sub-shield portion connected to the conductive pipe and the shielded connector,
the sub-shield portion comprises a braided member being at least partly covered by a coating
at least one caulking ring is fitted to an outer surface of an end of the sub-shield portion to fix the sub-shield portion to at least one of the conductive pipe and the shielded connector, and
at least one sealing member is fitted to the outer surface of the end of the sub-shield portion and an outer surface of the caulking ring to seal a connection between the sub shield-portion and at least one of the conductive pipe and the shielded connector.

8. The shielding member of claim 7, wherein:
the braided member is formed in a substantially tube shape by braided metal wires, and/or wherein the coating is made of an elastomer chosen from the group consisting of a silicone elastomer, a polyamide elastomer and a polyolefin elastomer.

9. A method of producing a shielded wire harness (A) comprising the following steps:
providing one or more of wires,
collectively enclosing the one or wires by means of a tubular shielding member;
respectively connecting one or more terminals of a shielded connector to the wire(s); and
connecting the shielding member to the shielded connector; wherein:
the shielding member comprises a main shield portion made of a conductive pipe, and a sub-shield portion connected to the conductive pipe and the shielded connector, and
the sub-shield portion comprises a braided member at least partly covered by a coating that provides fluid-tightness when the sub-shield portion is connected to the conductive pipe and the shielded connector,
the braided member at least partly is embedded in the coating and the method further comprises
fitting at least one caulking ring to an outer surface of an end of the sub-shield portion to fix the sub-shield portion to at least one of the conductive pipe and the shielded connector, and
covering at least one of a connection area of the sub-shield portion to the conductive pipe and the shielded connector (58) by at least one sealing member.

10. The method of claim 9, wherein the coating is made of an elastomer chosen from the group consisting of a silicone elastomer, a polyamide elastomer and a polyolefin elastomer.

11. The method of claim 9, wherein the sub-shield portion is connected to the conductive pipe and/or the shielded connector by at least one fixing member.

* * * * *